United States Patent [19]
Kawaguchi et al.

[11] Patent Number: 6,102,668
[45] Date of Patent: Aug. 15, 2000

[54] ELECTROMAGNETIC CONTROL VALVE

[75] Inventors: Masahiro Kawaguchi; Ken Suitou; Masakazu Murase; Atsuyuki Morishita, all of Aichi; Tomoo Okada, Saitama, all of Japan

[73] Assignees: Kabushiki Kaisha Toyoda Jidoshokki Seisakusho, Aichi-ken; Kabushiki Kaisha Saginomiya Seisakusho, Tokyo, both of Japan

[21] Appl. No.: 09/041,686

[22] Filed: Mar. 13, 1998

[30] Foreign Application Priority Data

Mar. 14, 1997 [JP] Japan ................................. 9-060670

[51] Int. Cl.$^7$ ........................................................ F04B 1/26
[52] U.S. Cl. ............................................................. 417/222.2
[58] Field of Search ............................. 417/222.2, 270; 137/596.17, 627.5

[56] References Cited

U.S. PATENT DOCUMENTS

| | | | |
|---|---|---|---|
| 4,723,891 | 2/1988 | Takenaka et al. | 417/222.2 |
| 4,730,986 | 3/1988 | Kayukawa et al. | 417/222.2 |
| 5,076,323 | 12/1991 | Schudt | 137/596.17 |
| 5,205,718 | 4/1993 | Fujisawa et al. | 417/222.2 |
| 5,282,329 | 2/1994 | Teranishi | 137/596.17 |
| 5,531,572 | 7/1996 | Kimura et al. | 417/222.2 |

FOREIGN PATENT DOCUMENTS

| | | |
|---|---|---|
| 5-99136 | 4/1993 | Japan . |
| 9-296876 | 11/1997 | Japan . |

*Primary Examiner*—Henry C. Yuen
*Attorney, Agent, or Firm*—McDermott, Will & Emery

[57] ABSTRACT

A electromagnetic control valve which is capable of controlling with small electromagnetic force is provided. In such electromagnetic control valve, a pressure-sensitivity control mechanism is provided in a space leading to the suction side of the compressor such that the pressure-sensitivity control mechanism faces to the crankcase pressure introducing opening of the valve main body. This pressure-sensitivity control mechanism is formed by a piston which comes into contact with the bottom surface of the valve rod. The differential pressure between the crankcase pressure and the suction pressure of the compressor is detected by the piston. Upon receipt of detection signals from a temperature sensor and a pressure sensor and an external signal, the pressure-sensitivity control mechanism adjusts the flow of refrigerant from the discharge side (high-pressure side) to the crankcase side of the compressor. Thus, the differential pressure can be controlled.

6 Claims, 5 Drawing Sheets

1-1

ELECTROMAGNETIC CONTROL VALVE

BACKGROUND OF THE INVENTION

1. Field of the Invention

The present invention relates to an electromagnetic control valve for a variable capacity compressor and, more particularly, to an electromagnetic control valve for a variable capacity compressor employed in a cooling unit for vehicles.

2. Related Art

Japanese Patent Application Number 8-109797, filed by the present applicants, discloses an electromagnetic control valve for a variable capacity compressor used in a cooling unit for vehicles (hereinafter referred to as "prior art A"). This electromagnetic control valve can reduce the load on the engine at the time of starting a vehicle, and it can be small in size. Furthermore, the valve characteristics of the electromagnetic control valve can readily be changed.

FIG. 5 is a schematic view of a capacity control mechanism of a variable capacity compressor in which the above electromagnetic control valve is employed.

A variable capacity compressor 20 has an electromagnetic capacity control valve 1-3 shown in FIG. 6 secured to its attachment concave portion 40. A plurality of cylinders 25 are provided inside a head portion 41 which communicates with a crankcase 21 of the compressor 20, and a piston 26 is slidably provided inside each cylinder 25. A driving shaft 27 is rotatably provided in an area extending from the crankcase 21 to the head portion 41. The driving shaft 27 is driven by an engine (not shown) via a pulley 34 and a belt 35 provided outside the crankcase 21.

The driving shaft 27 is provided with a wobble plate 29 which can vary the inclination of itself. The wobble plate 29 is linked to the pistons 26 through piston rods 24. The wobble plate 29, which is inclined as shown in FIG. 5, is rotated by the driving shaft 27, so that the piston rods 24 and the pistons 26 can move back and forth. By doing so, the attachment angle of the wobble plate 29 can be automatically adjusted depending on the differential pressure between a control chamber pressure Pc in the crankcase 21 and a suction side pressure Ps in the cylinders 25, while the stroke width of the pistons 26 can be changed depending on the inclination of the wobble plate 29.

Each cylinder 25 is provided with a suction opening S and a discharge opening D, and connected, via passages d and s, to a condenser 31, an evaporator 32, and an expansion valve 33. The electromagnetic control valve 1-3 communicates with a crank chamber C (or a control chamber C) in the crankcase 21 via a refrigerant passage 36, with the suction opening S via a refrigerant passage 37, and with the discharge opening D via a refrigerant passage 38.

FIG. 6 is a sectional view of the electromagnetic control valve of the prior art A when not energized.

The electromagnetic control valve 1-3 includes: (a) a valve member 8a which is provided in a valve chamber 18 formed by an upper main body 7 and a valve main body 17, and which repeatedly comes into contact with and depart from a valve seat 17d formed in a valve opening 17k situated on the way to a Pc pressure introducing opening 17h leading to the crank chamber C in the crankcase 21; (b) a Pd pressure introduces opening 17i which is formed on the opposite side of the Pc pressure introducing opening 17h from the valve chamber 18, and which leads to the discharge-side refrigerant passage 38 of the compressor 20; (c) a valve guide 17e extending from the Pd pressure introducing opening 17i to the Pc pressure introducing opening 17h; (d) a valve stem 8b which is integrally formed with the valve member 8a, and which is movable in the vertical direction inside the valve guide 17e; (e) a pushing unit 9 for pushing the valve member 8a in the valve opening direction; (f) a plunger 5 situated above the upper main body 7 which is vertically movable by virtue of the suction power of an electromagnetic coil 15, and which pushes the valve member 8a in the valve closing direction via a connecting rod 6 which is vertically movable in a through opening 7b of the upper main body 7; (g) a pressure equalizing opening 17q formed through the valve main body 17 and extending from the valve chamber 18 to the Pd pressure introducing opening 17i; (h) pressure bellows 11 formed below the Pd pressure introducing opening 17i and situated in a space 17g which communicates with the suction side S of the compressor 20; and (i) a corrective pin 10 which comes into point-contact with the lower surface of the valve stem 8b at its upper end and with the pressure bellows 11 at its lower end, and which is movable in a guide opening 17f extending from the Pd pressure introducing opening 17i to the space 17g.

With the suction pressure Ps of the piston cylinders 25 in FIG. 5, the pressure bellows 11 control the opening angle of the valve member 8a, which is situated in the refrigerant passage extending from the refrigerant passage (a discharge pressure supply passage) 38 to the crankcase 21.

A casing 2, a coil guide 3, the plunger 5, the connecting rod 6, the upper main body 7, the electromagnetic coil 15, and a plunger tube 16, integrally constitute an electromagnetic actuator. The opening angle of the valve is controlled depending on the current supplied to the electromagnetic coil by the electromagnetic actuator.

Japanese Patent Application Laid-Open No. 5-99136 also discloses an electromagnetic control valve for a variable capacity compressor (hereinafter referred to as "prior art B"). This electromagnetic control valve is provided with a first valve in the refrigerant passage extending from the high-pressure discharge side (Pd) to the crankcase side (Pc) of the compressor, and a second valve in the refrigerant passage extending from the crankcase side (Pc) to the suction side (Ps) of the compressor. Thus, the pressure Ps will not be directly affected by the pressure Pd, and the pressure Pc will not become too high when the discharge capacity decreases as the discharge gas (Pd) is introduced into the crank chamber.

With the electromagnetic control valve of the prior art A, the variable capacity point of the compressor can be varied by changing the set point of the suction pressure Ps. Since the absolute valve of the pressure Ps needs to be obtained in such method, high reliability is required in the sealed structure of the pressure bellows and the like. This causes a problem that it is expensive to produce such sealed structure formed by beam welding or the like.

In each electromagnetic control valve of the prior art A and prior art B, the suction pressure Ps of the compressor ranges from 1.5 to 4 Kg f/m$^2$ depending on the load, and it nears 10 kg f/m$^2$ at the time of starting. To control as desired under a heavy load, large electromagnetic force is required to meet the high suction pressure, and therefore, the coil should be large in size.

Further problems with the electromagnetic control valve of the prior art are that large electromagnetic force is required in obtaining a wide range of pressure, and that the sealed structure makes the hysteresis undesirably high, resulting in unreliable control operations.

SUMMARY OF THE INVENTION

The principal object of the present invention is to provide an electromagnetic control valve which is capable of controlling with low electromagnetic force at low cost.

In accordance with one aspect of the present invention, an electromagnetic control valve comprising: a valve member situated in a valve chamber formed by an upper main body and a valve main body; a valve seat with which the valve member repeatedly comes into contact, and which is formed at a valve opening in a passage between the valve chamber and a discharge pressure introducing opening formed below the valve chamber and leading to a discharge-side introducing conduit of a compressor; a crankcase inner pressure introducing opening which is formed on the opposite side of the discharge pressure introducing opening from the valve chamber, and which leads to a crank chamber of the compressor; a valve guide extending from the crankcase inner pressure introducing opening to the discharge pressure introducing opening; a valve rod vertically movable inside the valve guide; a plunger which pushes the valve member in a valve closing direction with the help of a vertically movable connecting rod inside a through opening formed through the upper main body, and which is situated above the upper main body and being vertically movable by virtue of the suction force of an electromagnetic coil; an inner pressure equalizing opening formed in the valve main body and extending from the valve chamber to the crankcase pressure introducing opening; a suction pressure introducing opening leading to the suction side of the compressor; a pressure-sensitivity control mechanism which is disposed in a space leading to the suction side of the compressor, and which faces to the crankcase inner pressure introducing opening of the valve main body; and a piston spring for receiving piston pressure. The pressure-sensitivity control mechanism is formed by a piston which comes into contact with the bottom surface of the valve rod. The differential pressure between the crankcase inner pressure and the suction pressure can be detected by the piston. With the detected differential pressure, the valve member controls the flow of the refrigerant from the discharge side (high-pressure side) to the crankcase side of the compressor.

In the above electromagnetic control valve, the top surface of the piston is chamfered so as to form an escape valve which includes the side surface of the piston as a slide portion. Another slide portion is formed at the upper end or in the vicinity of the upper end of the lower portion of the valve main body. The escape valve separates from the lower end of the valve rod when the differential pressure between the crankcase inner pressure and the suction pressure surpasses a predetermined valve. The slide portion of the escape valve separates from the slide portion of the lower portion of the valve main body, so that the refrigerant pressure can be released from the crankcase side to the suction side of the compressor.

The above electromagnetic control valve further comprises an external control unit for electromagnetically activating the valve member to control the refrigerant flow from the discharge side (high-pressure side) to the crankcase side of the compressor upon receipt of detection signals transmitted from a temperature sensor and a pressure sensor provided to the electromagnetic control valve and an external signal transmitted from a driving mode control device for vehicles or the like.

In the prior art, it is necessary to vary the pressure Ps in the range of 0 to 4 kg f/cm$^2$. In the present invention, on the other hand, the differential pressure between the pressure Pc and the pressure Ps can be set at approximately 1 Kg f/cm$^2$ under no load (in full-unloading mode). Thus, an electromagnetic control valve which can control with small electromagnetic force can be provided. The differential pressure between the pressure Pc and the pressure Ps can be detected by a simply structured member such as a piston, and only small electromagnetic force is required. Thus, the electromagnetic coil can be made smaller, the production costs can be reduced, only a small space is required in attachment, and the weight can be reduced. Unlike in controlling the differential pressure between the pressure Pc and the pressure Ps, the differential pressure between the pressure Pd and the pressure Pc is 2 kg f/cm$^2$ or larger, so the diameter of the valve opening can be made smaller than that.

The above and other objects and features of the present invention will be more apparent from the following description taken in conjunction with the accompanying drawings.

DETAILED DESCRIPTION OF THE PREFERRED EMBODIMENTS

The following is a description of embodiments of the present invention, with reference to the attached drawings.

Embodiment 1

Figure 1:
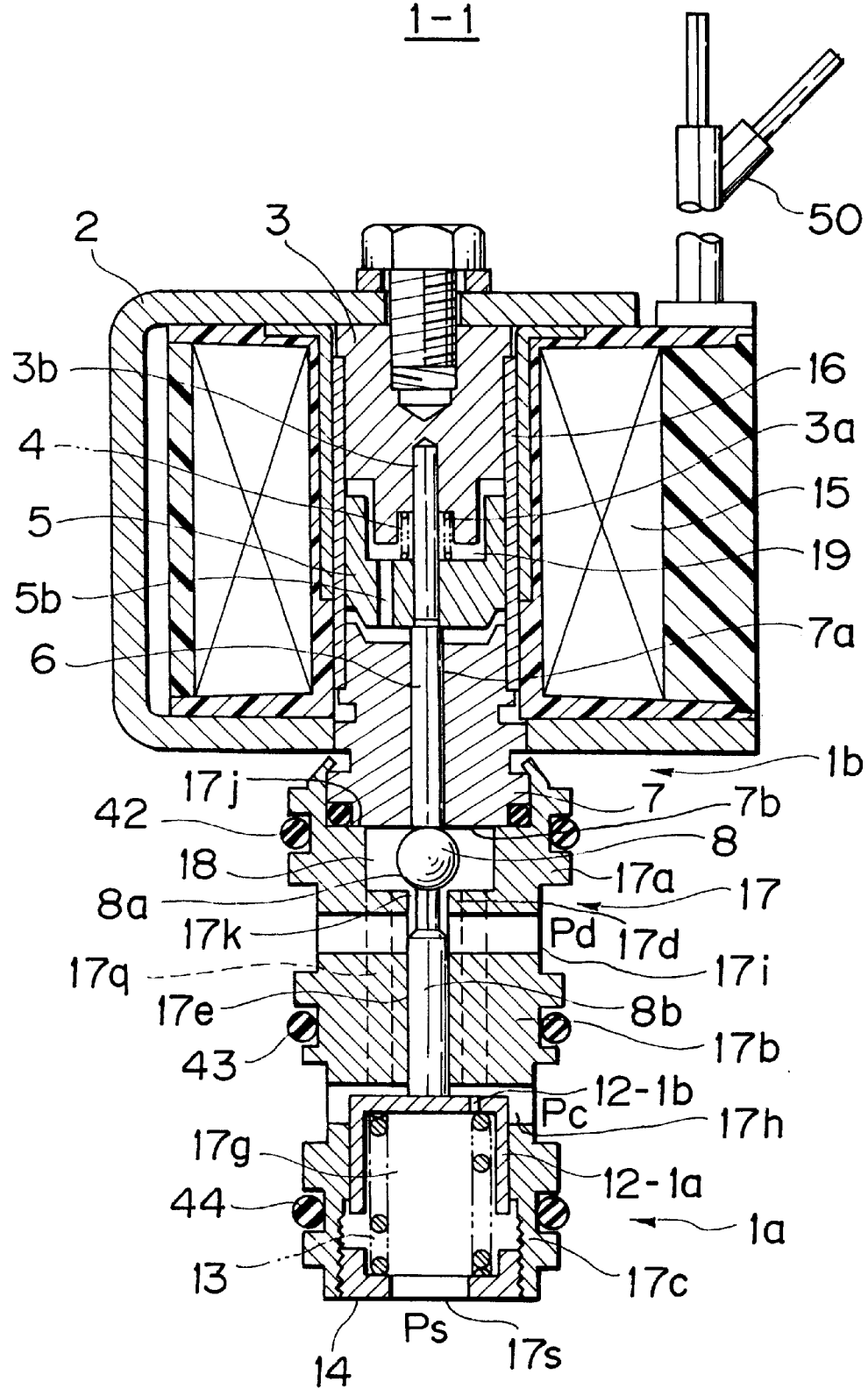
FIG. 1 is a sectional view of one embodiment of an electromagnetic control valve in accordance with the present invention.
Figure 2:
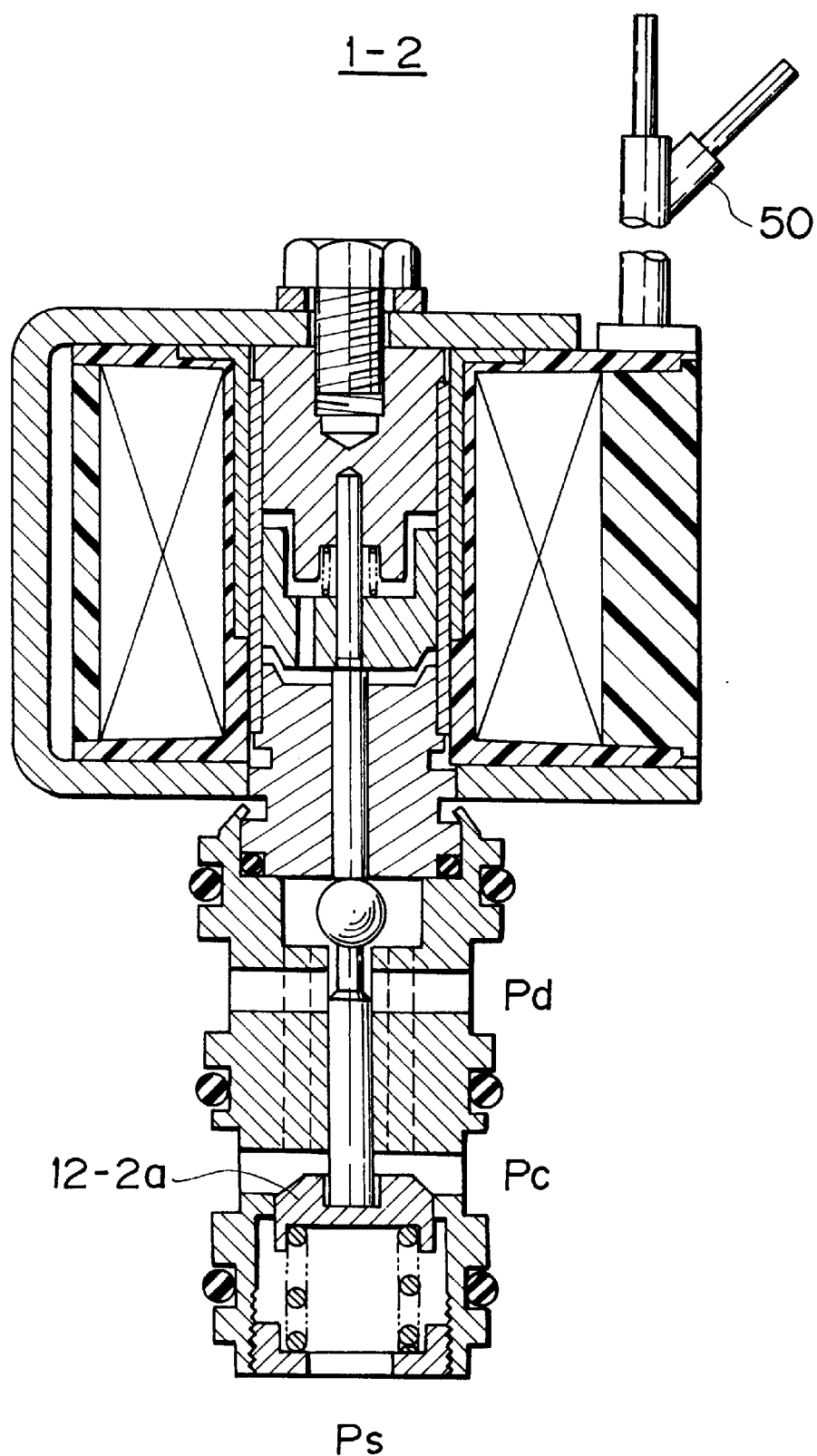
FIG. 2 is a sectional view of a second embodiment of an electromagnetic control valve in accordance with the present invention.
Figure 5:
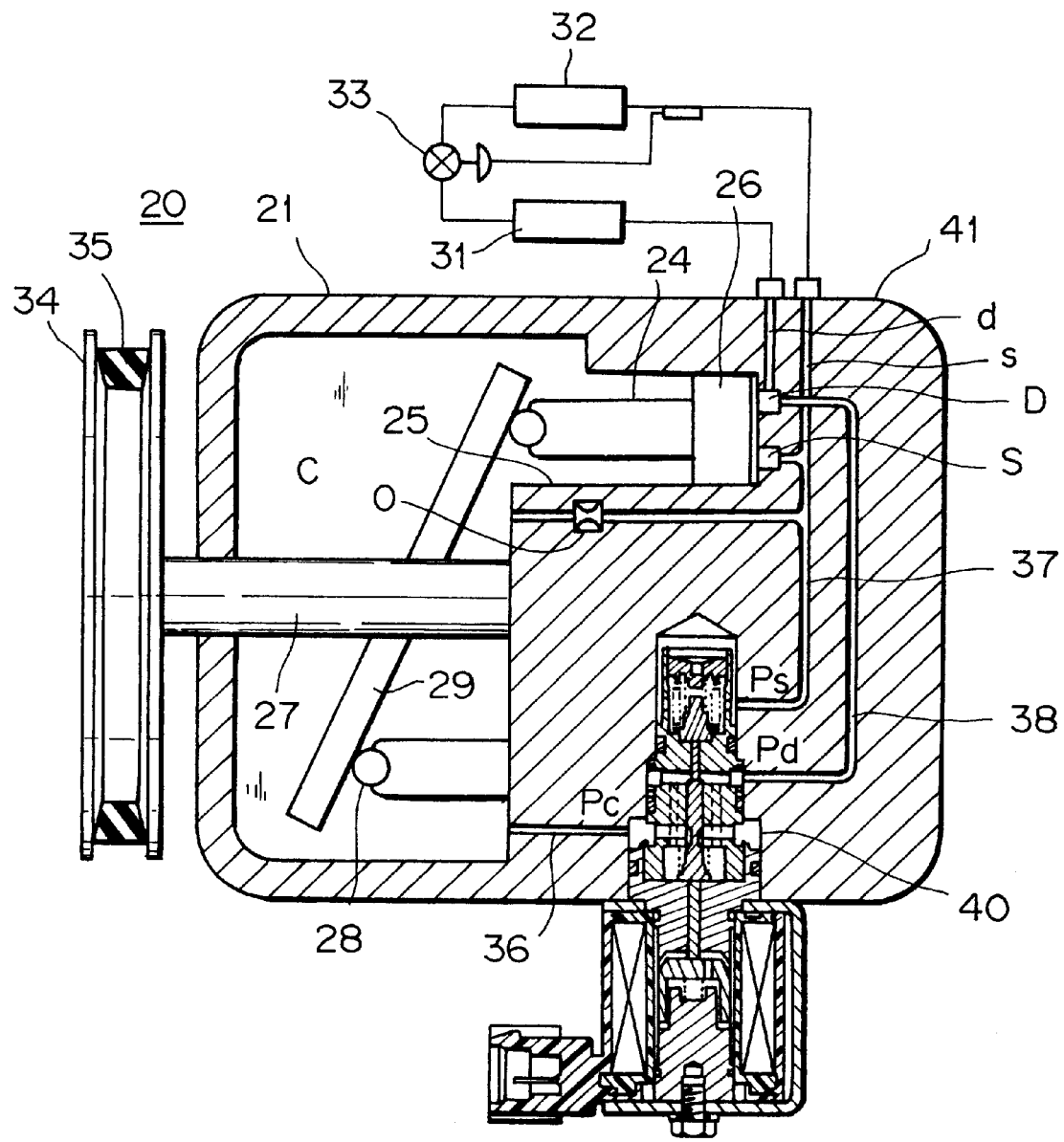
FIG. 5 is a schematic view of the capacity control mechanism in a variable capacity compressor in which a conventional electromagnetic control valve.

A capacity control mechanism for a variable capacity compressor in which an electromagnetic control valve is used is shown in FIG. 5. FIG. 1 shows an electromagnetic control valve 1—1 attached to such capacity control mechanism.

The electromagnetic control valve 1—1 is made up of a control valve position 1a and an electromagnetic proportional control unit 1b. A valve main body 17 is divided into a valve main body upper portion 17a, a valve main body intermediate portion 17b, and a valve main body lower portion 17c.

The valve main body upper portion 17a includes a concave portion. A valve chamber 18 is formed by the upper surface 17j of the concave portion and the lower portion 7b of an upper main body 7. The valve main body upper portion 17a is also provided with a valve seat 17d.

The valve main body lower portion 17C also includes a concave portion. A piston 12-1a having a rectangular shape minus one side in cross section is formed in a piston lower space 17g which leads to the suction side of the compressor such that the upper surface of the piston 12-1a faces a Pc pressure introducing opening 17h of the valve main body 17. The piston 12-1a has a relief aperture 12-1b for letting fluid flow from Pc to Ps (see FIG. 1) to maintain safety in control operations. With a much simpler structure, the relief aperture 12-1b replaces the large-scale orifice O of the capacity control mechanism of the prior art shown in FIG. 5.

A spring adjustment member 14 is screwed into the inner surface of the lower portion of the valve main body lower portion 17c, thereby forming the above-mentioned piston lower space 17g. When the piston 12-1a is pushed in the opening direction of a valve member 8 by an encouraging means, i.e., a piston spring 13, it will be brought into contact with the lower surface of a valve rod 8b. A Ps pressure introducing opening 17s is formed in the center of the spring adjustment member 14.

Between the valve main body upper portion 17a and the valve main body intermediate portion 17b, a Pd pressure introducing opening 17i leading to the discharging outlet D of the compressor 20 is formed. The Pd pressure introducing opening 17i communicates with a valve chamber 18 via a valve opening 17k. Between the valve main body intermediate portion 17b and the valve main body lower portion 17c, the Pc pressure introducing opening 17h is formed. The Pc pressure introducing opening 17h communicates with the chamber 18 via inner pressure equalizing openings or passage 17q.

The piston lower space 17g, which forms a cylinder chamber, of the valve main body lower portion 17c leads to the suction side S of the compressor 20. Circular grooves for accommodating sealing O-rings 42, 43, and 44 are formed on the outer peripheries of the valve main body upper portion 17a, the valve main body intermediate portion 17b, and the valve main body lower portion 17c, respectively.

Inside the valve chamber 18, the valve member 8, which is integrally joined to the valve rod 8b, freely comes into contact with an depart from the lower end of a connecting rod 6, and the valve portion 8a of the valve member 8 faces and comes into contact with the valve seat 17d. The valve member 8 is subjected to the attraction/repulsion of a coil acting on a plunger 5 guided by a guide pin 3b via the connecting rod 6, and to the pushing power of a plunger spring 4.

Inside a plunger tube 16, the upper main body 7 and the coil guide 3 are secured by welding. Inside a casing 2, an electromagnetic coil 15 surrounds the plunger tube 16. The plunger 5 can move in an axial direction inside a plunger chamber 19 situated between the upper main body 7 and the coil guide 3. The plunger 5 is provided with a through opening 5b for connecting both spaces formed above and below the plunger 5 inside the plunger chamber 19.

Below the plunger 5, the connecting rod 6 is inserted into a guide hole 7a formed in the center of the upper main body 7. The connecting rod 6 is slidable in the vertical direction. Here, the upper end of the connecting rod 6 is in contact with the lower surface of the plunger 5 guided by a guide pin 3b, while the lower edge of it is in contact with the valve member 8.

The plunger spring 4 is formed in a center concave portion 3a of the coil guide 3, so that the plunger spring 4 can be interposed between the coil guide 3 and the plunger 5. Thus, the plunger 5 is pushed toward the valve chamber 18 by the plunger spring 4.

Figure 6:
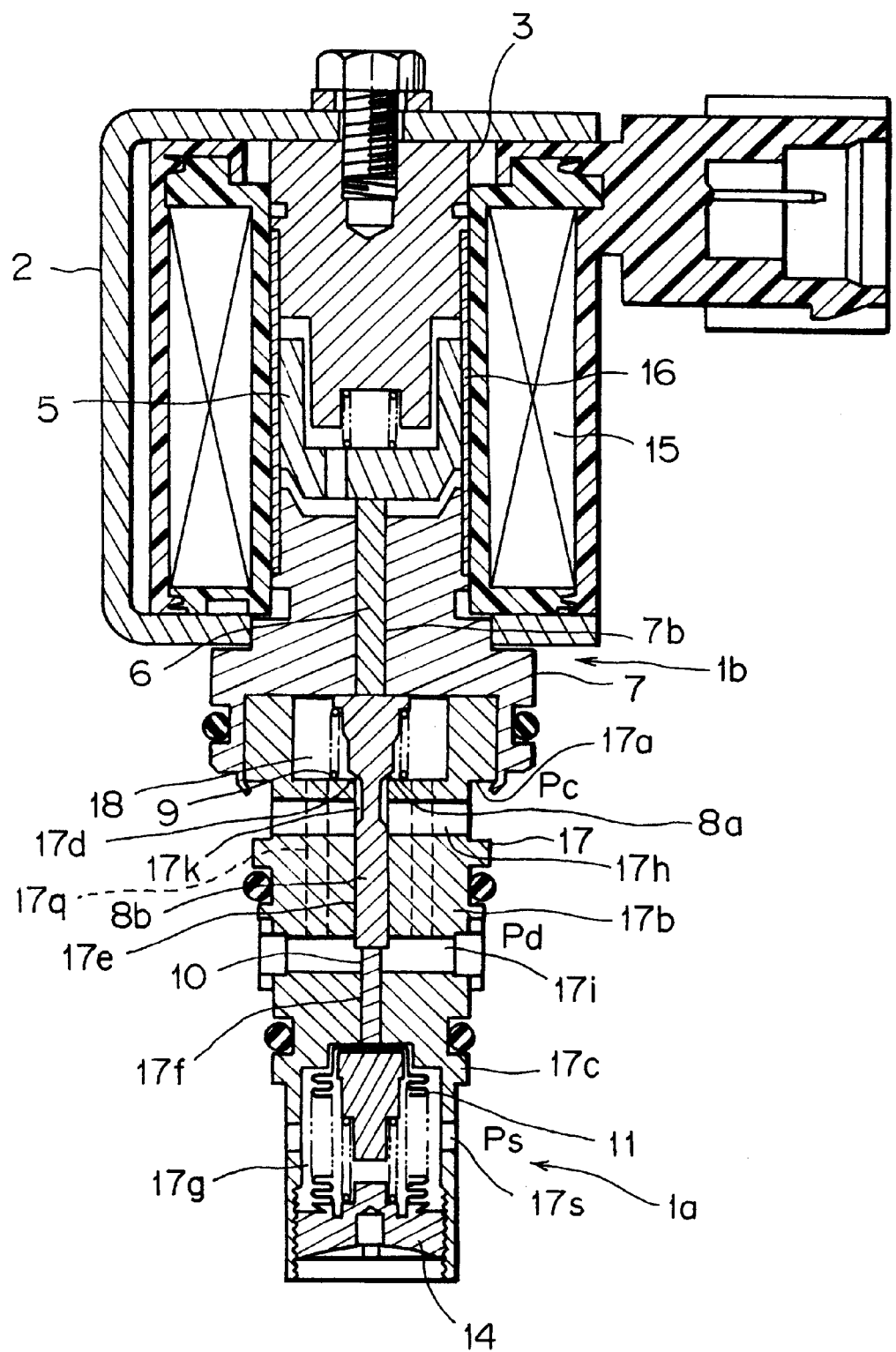
FIG. 6 is a sectional view illustrating the conventional electromagnetic control valve when not energized.

The electromagnetic control valve 1—1 is inserted into the attachment portion 40 of the compressor 20 until the casing 2 comes into contact with the outer surface of the head portion 41 of the compressor 20, as in the prior art shown in FIG. 6. Here, the Pc pressure introducing opening or port 17h communicates with a refrigerant path (Pc) (not shown), the piston lower space 17g communicates with another refrigerant path (Ps) (not shown) via the Ps pressure introducing opening or port 17s, and the Pd pressure introducing opening or port 17i communicates with yet another refrigerant path (Pd) (not shown).

As shown in FIG. 5, if the control chamber pressure Pc is higher than the suction side pressure Ps, the variable capacity compressor 20 operates in an unloading mode in which a wobble plate 29 rises to shorten the compressing strokes. If the pressure Pc is equal to the pressure Ps, the variable capacity compressor 20 operates in a full-loading mode. If the pressure control chamber C communicates with the discharging side D, the fluid will flow from Pd to Pc and the pressure Pc will become higher than the pressure Ps. If the pressure control chamber C is shut out from the discharging side D, the pressure Pc will be equal to the pressure Ps. In view of this, the capacity of the compressor 20 can vary from a full-loading mode to a full-unloading mode by employing the electromagnetic control valve 1—1, which adjusts the flow rate of the refrigerant by the suction side pressure Ps, between the pressure control chamber C and the discharging side D.

In such electromagnetic control valve 1—1, the differential pressure between the pressure Pc and the pressure Ps is detected by the piston 12-1a, and the valve for controlling the flow from the high-pressure side (Pd) to the pressure control chamber (Pc) operates depending on the detected differential pressure. The differential pressure between the pressure Pc and the pressure Ps is detected by varying the electromagnetic force (or the current), and the tilt angle of the wobble plate of the compressor is changed depending on the detected differential pressure, so as to vary the capacity of the compressor.

Embodiment 2

Figure 3:
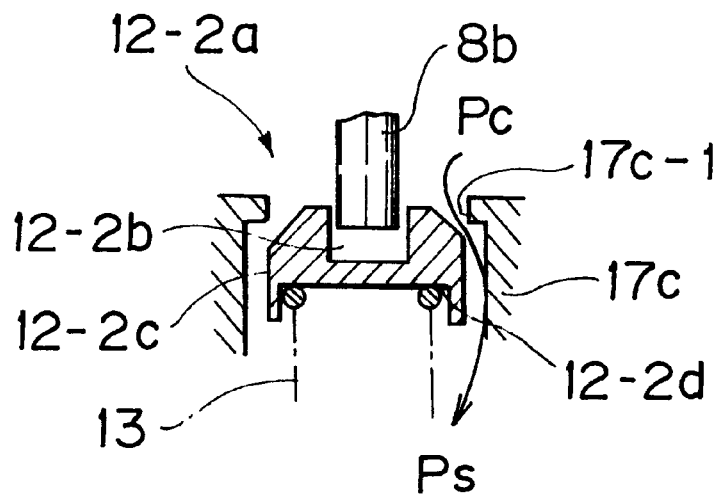
FIG. 3 is a sectional view illustrating the escape valve shown in FIG. 2 when it is open.

As shown in FIG. 3, the upper surface of an escape valve 12-2a having a mechanism of releasing pressure Pc is chamfered at both sides. This escape valve 12-2a has a concave portion 12-2b in the center of its upper surface, a slide portion 12-2c on its outer periphery, and a spring receiving portion 12-2d on the lower surface. The piston string 13 is provided in a space which leads to the suction side of the compressor, so that is faces to the Pc pressure introducing opening 17h formed between the valve main body upper portion 17a and the valve main body lower portion 17c. The escape valve 12-2a having the pressure Pc releasing mechanism is situated such that the slide portion 12-2c repeatedly comes into contact with and depart from a slide portion 17c-1 formed at the upper end of the valve main body lower portion 17c.

When the differential pressure between the pressure Pc and the pressure Ps surpasses a predetermined valve, the escape valve 12-2a having the pressure Pc releasing mechanism departs from the lower end of the valve rod 8b, and the slide portion 12-2c of the escape valve 12-2a departs from the slide portion 17c-1 of the valve main body lower portion 17c, thereby releasing the refrigerant pressure from the crankcase side (Pc) toward the suction side (Ps) of the compressor.

Embodiment 3

Figure 4:
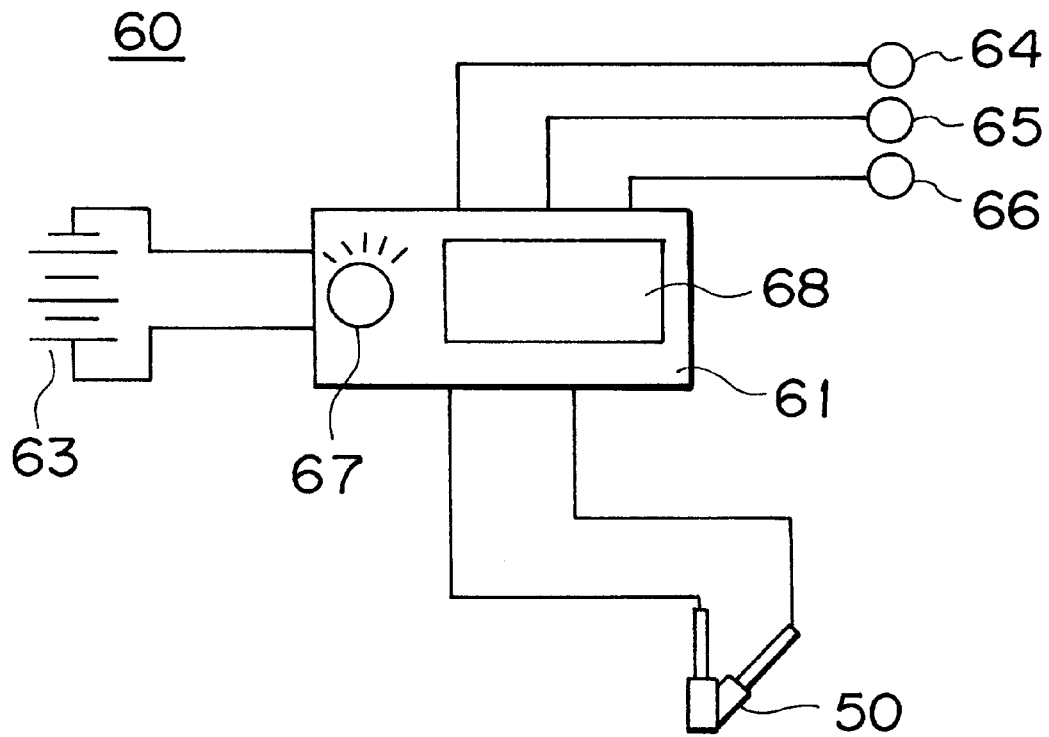
FIG. 4 is a schematic view of an external control unit of a third embodiment of the present invention.

FIG. 4 shows an embodiment of an external control unit 60 connected to each terminal 50 of the electromagnetic control valves 1—1 and 1-2 of the first and second embodiments of the present invention.

In the external control unit 60, a controller 61 sends current to an external variable valve, i.e., the electromagnetic control valve 1—1 or 1-2, in an amount depending on the deviation detected by comparing detection signals 64 and 65 transmitted from the temperature sensor and the pressure sensor provided in the electromagnetic control valve 1—1 or 1-2 and an external signal 66 transmitted from the driving control unit of a vehicle with set values inputted beforehand into a controller setting device 67 provided on the controller 61.

The electromagnetic unit of the electromagnetic control valve 1—1 or 1-2 generates electromagnetic force depending on the current intensity. The electromagnetic force acts on the spherical surface of the valve member 8 so as to preventing the refrigerant from flowing from the discharging side (Pd) into the crankcase (Pc). As a result of this, the variable capacity point of the electromagnetic control valve 1—1 or 1-2 can be changed. Reference numeral 63 indicates a power source, and reference numeral 68 indicates a controller display.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electromagnetic control valve comprising:

a valve member disposed in a valve chamber formed in an upper main body and a valve main body;

a valve seat with which said valve member sealingly contacts, said valve seat being formed in a valve opening in a passage between the valve chamber and a discharge pressure supply port which is formed on a first side of the valve chamber and which communicates with a discharge duct of a compressor;

a crankcase pressure port which communicates with a crank chamber of the compressor;

a valve guide extending from said crankcase pressure port to said discharge pressure supply port;

a valve rod reciprocally disposed in said valve guide;

a plunger for displacing said valve member in a valve closing direction via an axially movable connecting rod which is disposed through an opening formed in the upper body, said plunger being disposed on a second side of the upper main body and axially displaceable by force selectively produced by an electromagnetic coil;

a pressure equalizing passage which is formed through the valve main body and which communicates the valve chamber with said crankcase pressure port, said valve member selectively opening and closing said passage between the valve chamber and the discharge pressure port to control communication between the discharge pressure port and the crankcase pressure port via the pressure equalizing passage;

a suction pressure port communicating with a suction side of the compressor;

a pressure sensitive control mechanism disposed in a space leading to the suction side of the compressor, said pressure sensitive control mechanism comprises:

a piston spring; and a piston which is operatively disposed between said piston spring and said valve rod to fluidly separate said crankcase pressure port and said suction pressure port and to have one side exposed to pressure in said crankcase pressure port and a second side exposed to pressure in said suction pressure port so as to be responsive to a pressure differential between the pressure in said crankcase pressure port and the pressure in said suction pressure port, and to apply a force indicative of the pressure differential to the valve member through the valve rod.

2. The electromagnetic control valve according to claim 1, wherein:

an edge of the side of the piston which is exposed to the pressure in the crankcase pressure port is chamfered so as to form an escape valve arrangement wherein a side peripheral surface of the piston as a first slide portion of the escape valve, and wherein a second slide portion is formed at the upper end or in the vicinity of the upper end of the lower portion of the valve main body, the piston separates from the lower end of said valve rod when the pressure differential between the crankcase pressure port and the suction pressure port surpasses a predetermined valve, and the first slide portion of the escape valve separates from the second slide portion of the lower portion of the valve main body, so that pressure can be released from the crankcase pressure port to the suction pressure port.

3. The electromagnetic control valve according to claim 1, further comprising:

an external control unit for electromagnetically activating said valve member to control a flow of refrigerant from the discharge duct which communicates the discharge pressure support port, to a crankcase of the compressor which communicates with the crankcase pressure port, upon receipt of detection signals transmitted from a temperature sensor and a pressure sensor provided to said electromagnetic control valve and an external signal transmitted from a driving mode control device.

4. An electromagnetic valve comprising:

a first port fluidly communicated with a source of positive pressure;

a second port communicated with a source of control pressure;

a third port communicated with a source of negative pressure;

a pressure chamber;

a valve element controlling fluid communication between the first port and the pressure chamber;

a passage formed through a body of the valve and which fluidly communicates the pressure chamber and the second port;

a piston fluidly separating the second and third ports and reciprocal in response to a pressure differential which prevails between the second and third ports;

a valve rod operatively interposed between the valve element and piston;

a piston spring which applied a bias to said piston which moves the piston into engagement with the valve rod and biases the valve rod in a direction which moves the valve element to a position in which communication between the first port and the pressure chamber is established; and an electromagnetically biased plunger which is operatively connected with the valve element to apply a bias which moves the valve element to a position wherein communication between the first port and the pressure chamber is cut off.

5. An electromagnetic valve according to claim 4, wherein the first, second and third ports are respectively communicated with a discharge port, a wobble plate chamber and an induction port of a compressor.

6. An electromagnetic valve according to claim 4, wherein the piston forms past of an escape valve arrangement which permits fluid communication between the second and thirds ports when the piston is displaced by more than an predetermined amount against the bias of the piston spring by the pressure differential between the second and third ports.

* * * * *